(12) United States Patent
Chatani et al.

(10) Patent No.: US 8,577,808 B2
(45) Date of Patent: **\*Nov. 5, 2013**

(54) METHODS FOR SECURELY DISTRIBUTING COMPUTER SOFTWARE PRODUCTS

(75) Inventors: Masayuki Chatani, Foster City, CA (US); Dominic Saul Mallinson, Foster City, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/684,714

(22) Filed: Jan. 8, 2010

(65) Prior Publication Data

US 2010/0115507 A1    May 6, 2010

Related U.S. Application Data

(63) Continuation of application No. 11/619,179, filed on Jan. 2, 2007, now Pat. No. 7,664,709, and a continuation of application No. 09/773,716, filed on Jan. 31, 2001, now Pat. No. 7,174,568.

(51) Int. Cl.
*G06F 21/00* (2013.01)

(52) U.S. Cl.
USPC ............... 705/54; 705/59; 705/55; 705/56

(58) Field of Classification Search
USPC .......................................................... 705/54
See application file for complete search history.

(56) References Cited

U.S. PATENT DOCUMENTS

| | | | | |
|---|---|---|---|---|
| 4,918,728 A * | 4/1990 | Matyas et al. | | 380/280 |
| 5,001,752 A * | 3/1991 | Fischer | | 713/178 |
| 5,166,886 A * | 11/1992 | Molnar et al. | | 700/234 |
| 5,745,879 A * | 4/1998 | Wyman | | 705/1.1 |
| 5,892,900 A * | 4/1999 | Ginter et al. | | 726/26 |
| 6,236,971 B1 * | 5/2001 | Stefik et al. | | 705/54 |
| 6,289,455 B1 * | 9/2001 | Kocher et al. | | 713/194 |
| 6,470,085 B1 * | 10/2002 | Uranaka et al. | | 380/231 |
| 6,788,788 B1 * | 9/2004 | Kasahara et al. | | 380/277 |
| 7,096,504 B1 * | 8/2006 | Tagawa et al. | | 726/27 |
| 7,174,568 B2 * | 2/2007 | Chatani et al. | | 726/27 |
| 7,239,709 B1 * | 7/2007 | Yamada et al. | | 380/281 |
| 2003/0044018 A1 * | 3/2003 | Tomlinson | | 380/277 |

* cited by examiner

*Primary Examiner* — Jacob C. Coppola
(74) *Attorney, Agent, or Firm* — Martine Penilla Group, LLP

(57) ABSTRACT

A product distribution and payment system for limited use or otherwise restricted digital software products. Digital content data comprising a software product to be rented is made available to customers through a detachable local storage medium, such as a DVD or CD-ROM disc, or over a network connection. The product digital content is capable of being accessed and played back through a computer or game console at the customer site. The software product may comprise a limited use product that is restricted in the number of plays or duration of use. The customer is allowed to download and purchase the product using his computer or playback console. The product purchase information is encoded and transmitted to the content distributor. When the preset time or number of plays has elapsed the software program is frozen and access to the program is not allowed. In one embodiment of the present invention, a two-way, public key/private key encryption system is implemented to transmit the product and usage information between the server providing the software product and the customer computer system.

18 Claims, 8 Drawing Sheets

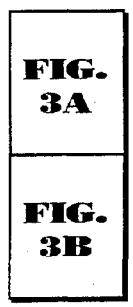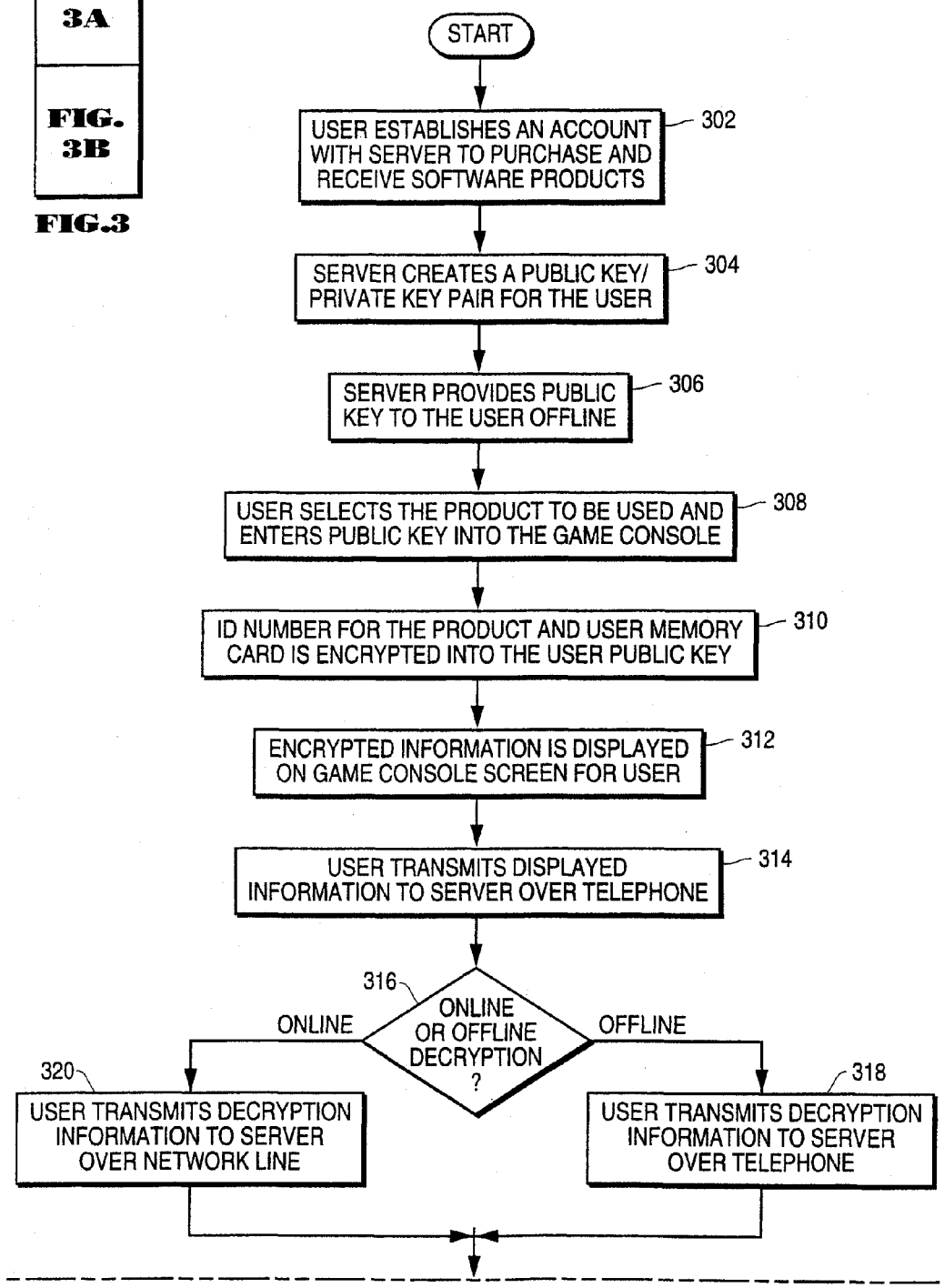

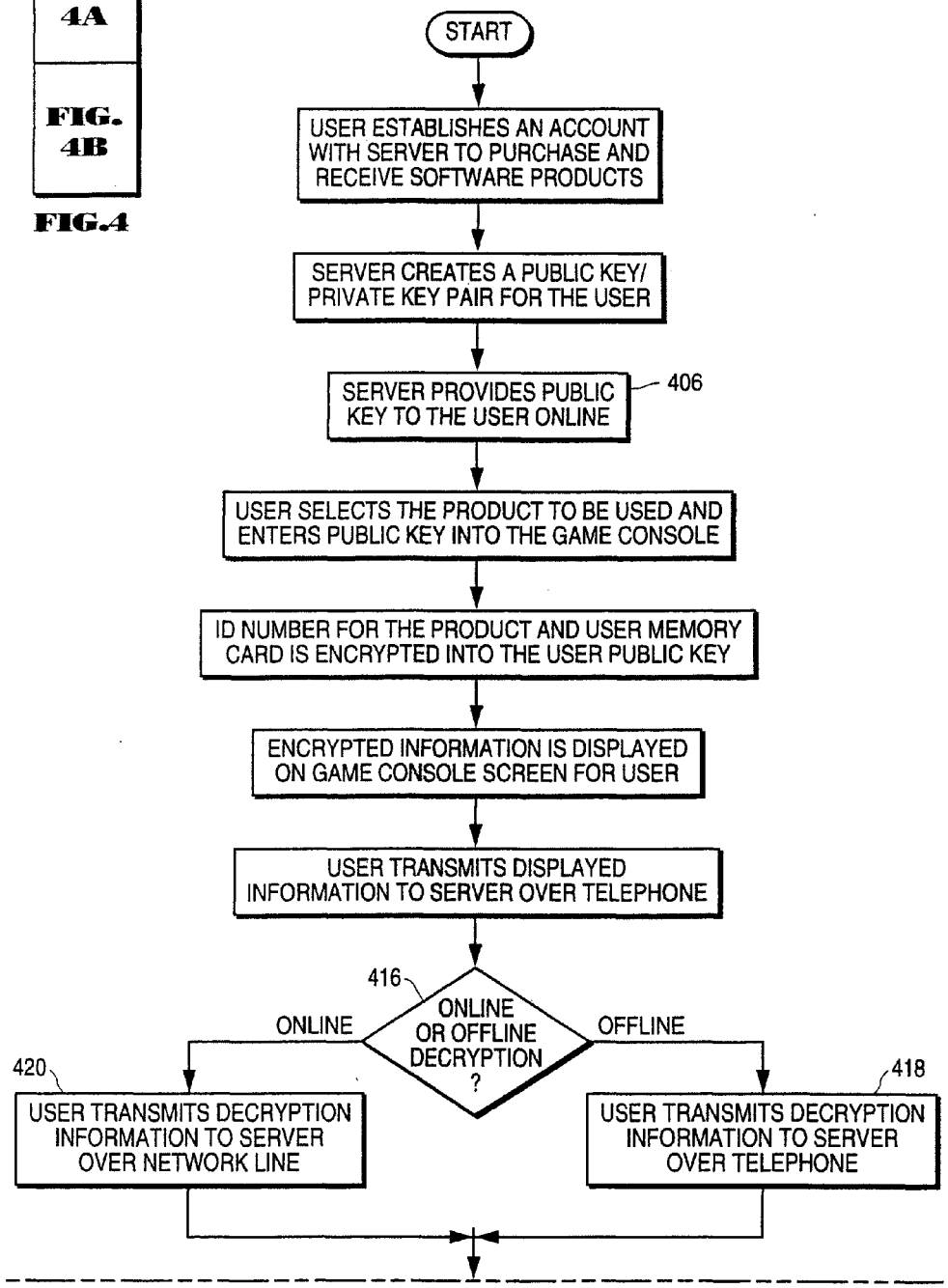

METHODS FOR SECURELY DISTRIBUTING COMPUTER SOFTWARE PRODUCTS

CLAIM OF PRIORITY

This application is a Continuation Application under 35 USC §120 of U.S. application Ser. No. 11/619,179 entitled "Method and System for Securely Distributing Computer Software Products", and filed on Jan. 2, 2007 now U.S. Pat. No. 7,664,709, and is a Continuation Application under 35 USC §120 of U.S. application Ser. No. 09/773,716 entitled "Method and System for Securely Distributing Computer Software Products", and filed on Jan. 31, 2001 now U.S. Pat. No. 7,174,568, both of which are herein incorporated by reference.

FIELD OF THE INVENTION

The present invention relates generally to computer networks, and more specifically, to a system for distributing and leasing limited use software products over computer networks.

BACKGROUND OF THE INVENTION

The widespread acceptance of high capacity digital media has significantly impacted the distribution and marketing of computer programs and general entertainment products. Increasingly, digital media, such as CD-ROM (Compact Disk-Read Only Memory) and DVD (Digital Versatile Disks) media, and removable memory cards for computers and handheld digital devices, are beginning to replace traditional analog media such as magnetic cassettes and VHS tapes for the distribution of a wide range of products. For example, music, movies, computer games, computer programs, and even books are increasingly becoming packaged and distributed on digital media for playback on CD players, computers, DVD players, and other digital devices.

Moreover, with the advent of the Internet and electronic commerce ("e-commerce") business models, many digital-based data products, such as computer software, games, music, movies, and other digital content can conveniently be distributed over computer networks. Because of the different types of software content and products that can be programmed onto the high capacity storage products of present digital media, such as CD-ROMS, traditional distribution models for these products are becoming outmoded. The implementation of downloaded digital content using server-client computer networks and secure encrypted communications greatly facilitates the purchase of digital software products. As e-commerce models continue to be refined and implemented, the distribution of these products is also undergoing significant changes. In many cases, customers do not need to visit stores and retail locations to purchase the physical media that contains the software product. Instead, the product can be downloaded directly to the customer's computer for storage and playback. Using secure credit card and other e-commerce payment methods, the product can be purchased on-line as well.

Although present e-commerce distribution methods facilitate the purchase and distribution of standard products that are out rightly bought by the customer, many types of entertainment products are limited use products, and such products are usually available only as physical packaged products, rather than as downloadable content. The best example of such a product is a movie or computer game that is rented for only a short term. At present, distribution of these temporary or limited use products involves the customer visiting a rental location, renting the product and then returning the product after the rental period. Compared to on-line and off-line e-commerce distribution systems being developed for unlimited use or non-restricted ownership items, such traditional distribution channels for limited use products are cumbersome and disadvantageous.

In order to encourage the use or rental of limited use computer products or samples, convenient purchase and distribution methods using present computer network capabilities must be developed. What is needed, therefore, is a system that allows content providers or distributors to provide limited use products either as physical products or downloadable content and have the allocated usage accurately tracked and accounted.

SUMMARY

A product distribution and payment system for limited time use or otherwise restricted digital software products is described. Digital content data comprising a software product to be leased or rented is made available to customers through a detachable local storage medium, such as a DVD or CD-ROM disc, or over a network connection. The software product is capable of being accessed and played back through a computer or game console at the customer site. The customer is allowed to download and purchase the product using his computer or playback console in an on-line distribution model, or receive packaged media containing the software product in an off-line distribution model. The software product may comprise a limited use product that is restricted in the number of plays or duration of use. The product purchase information is encoded and transmitted to the product distributor. When the preset time or number of plays has elapsed the software program is frozen and access to the program is not allowed. In one embodiment of the present invention, a two-way, public key/private key encryption system is implemented to transmit the product and usage information between the server providing the software product and the customer computer system. The customer communicates with the product distributor through either on-line or off-line means to decrypt the encrypted software product. Decryption can unlock a feature of the software product or the entire software product.

In one embodiment, a computer-implemented method for distributing a software module by a distribution server having access to a plurality of software modules is disclosed. The method includes encrypting said software module with an encryption key and distributing said software module that is encrypted in, over a network, from said distribution server to storage of a computing device of a user. The encryption with the encryption key and the distribution can occur at the time a user accesses or at some time before. The method includes establishing an exchange between the distribution server and the computing device of the user. The exchange including (i) establishing a user key pair between the distribution server and the computing device of the user; and (ii) establishing a client key pair between the distribution server and the computing device of the user, where the exchange between the distributor server and the computing device of the user defines multi-layer encryption from the user and client key pairs. Then, preparing a decryption key for transmission to the computing device of the user. The preparing includes encrypting the decryption key with a layer defined from the client key pair and then encrypting the decryption key with a layer defined from the user key pair, which defines the multi-layer encryption of the encryption key. The method then transmits the decryption key having the multi-layer encryption to the computing device of the user. The decryption key, once removed of the multi-layer encryption at the computing device, is used to decrypt the software module present at the storage of the computing device.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A limited use software distribution and leasing system for software products over a computer network is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Figure 1:
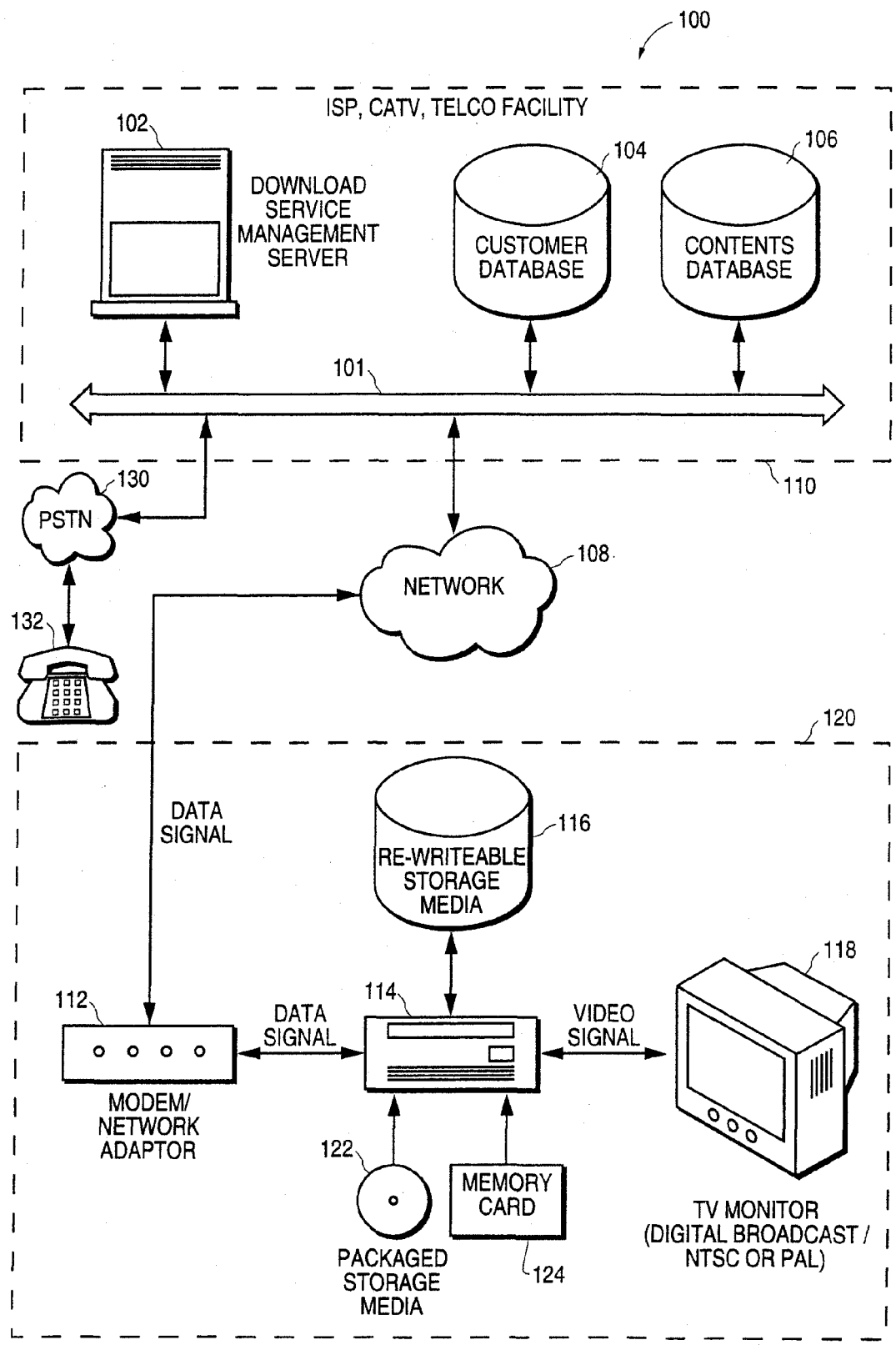
FIG. 1 illustrates a block diagram of a computer network system that implements embodiments of the present invention.

FIG. 1 is a block diagram of a computer network system that can be used to implement a limited use software product distribution system, according to one embodiment of the present invention. The system 100 of FIG. 1 enables the transmission, execution and/or playback of limited use software products. The term "limited use software products" in the context of the specification and claims shall be understood to refer to a collection of downloadable digital data that may consist of any one of video linear streaming data, such as motion picture data in MPEG or MPEG2 format; linear audio streaming data, such as music data in MP3 format; binary program data; computer games; binary text data; or any combination of such data or similar data. In general, limited use software products do not include services or data that are used solely to provide access to a network, such as web browser software or protocol handlers whose main function is only to establish a network connection.

As shown in FIG. 1, system 100 includes a server side system 110 comprising a download service management server 102, a customer database 104, and a contents database 106, which are interconnected by a local area network (LAN) 101. The limited use software product content is generally stored in a contents database 106, which makes up part of the server side system 110. The customer database 104 stores a collection of data about individual customers who access the download server 102 through a bi-directional network 108. The data for each individual customer may consist of the customer's name, home address, age, gender, occupation, income, hobbies, purchasing history, preferences, and other descriptive information that might be useful to vendors or advertisers who are using the system. Such data may not be static, but instead may be updateable based on a user's access history of the primary content data. For example, the data may be updated to reflect which software products are accessed and/or how many times a given category (e.g., type of music, genre of movies, and so on) of software products are accessed. This enables content providers and advertisers to tailor their messages and content more effectively to a given customer.

The download service management server 102 is a server system that is configured to handle download requests from a user. Access to the server 102, which may comprise one of several servers, is facilitated typically through a router on the LAN 101, which directs requests to the download management server 102. When the server 102 receives requests from a user, the server executes a download of requested software products from the contents database 106. The data comprising the products is then transmitted via the network 108 by means of a known networking protocol standard, such as the file transfer protocol (ftp).

The network 108 is normally a bi-directional digital communications network that connects the user's terminal hardware with the download service management server 102 provided on the server side of the system. With current technologies, a CATV (cable television) bi-directional network, ISDN (Integrated Services Digital Network), DSL (Digital Subscriber Line), or xDSL high-speed networks are examples of existing network infrastructures enabling the necessary network connections for implementing embodiments of the present invention. In one embodiment, network 108 may represent the Internet, in which case the server 102 typically executes a web server process to transmit data in the form of HTML data to client computers executing web browser processes.

The client side 120 of the system configuration shown in FIG. 1 comprises a modem or network adapter 112, a networked game console 114, which utilizes a detachable storage medium 122 therein, and a TV monitor or any other suitable display device 118 connected to the game console 114. The modem or network adapter 112 is a device that is used to connect the client's terminal hardware, in this case the game console 114, for connection to the network 108. For example, if network 108 is a CATV network, modem 112 may be implemented as a cable modem device; and if network 108 is an ISDN network, modem 112 may be implemented as a terminal adapter.

In one embodiment of the present invention, the detachable storage media 122 stores a collection of interactive or non-interactive auxiliary content, such as computer games, movies, music clips, or advertisements which can be made up of video images, animations, sounds, applets, and so on. In one embodiment, the detachable storage media 122 comprises a CD-ROM or DVD disc. For the embodiment illustrated in FIG. 1, the detachable storage media 122 is a packaged storage media that stores one or more software products for use by the user. Such products may include computer games, audio content, video content, or the like. The packaged storage media 122 may also include a download management software program that controls the downloading of the software product data from the contents database 106 to the networked game console 114. The client system 120 also includes a re-writeable storage media 116 coupled to the networked game console 114. During normal operation, the networked game console 114 transfers data from the packaged storage media 122 onto the re-writeable storage media for temporary or medium term storage and execution. The re-writeable storage media 116 can also be used to store data or programs downloaded by the client system 120 over network 108. The re-writeable storage media 116 may be implemented as a hard disk drive (HDD), flash memory device, or other suitable non-volatile memory device that attaches to the game console 114 through a port connection.

For the embodiment illustrated in FIG. 1, the network game console 114 also has an interface port for the installation of a memory card 124. Such a memory card might be implemented as a proprietary card format, or a standard format device, such as PC/MCIA format or a similar card format. The memory card 124 stores various firmware parameters and operating environment data that are specific to the particular network game console 114 that the card is installed in. For example, the memory card can be used to store the identification number (ID) assigned to the particular game console. In certain applications, the memory card can also be used to store certain software products, such as computer games or other programs or content to be played back or executed on the game console.

In general, the networked game console 114 is a network connectable playback device of interactive digital contents. Such a game console 114 normally utilizes the packaged storage media 122 as a contents distribution media in a non-networked environment. In other words, under ordinary use, the game console 114 is capable of playing back media contained on the packaged storage media 122, which is normally an interactive video program (such as a game) even if the game console 114 is not connected to the network 108. For this embodiment, the distribution of the software product is referred to as an "off-line" distribution embodiment. The user may also communicate with the server system 110 in an off-line embodiment. In this case, the server is coupled to a public switched telephone network (PSTN) 130 that provide access to the user through a telephone 132. The telephone 132 may be a touch-tone phone that allows the customer to enter alphanumeric input in response to command options provided by the server system. Alternatively, the user uses the telephone to transmit voice commands to the server system 110 or speak with an operator associated with server system 110.

In an alternative embodiment of the present invention, the packaged storage media 122 is used in a networked environment and operates in conjunction with downloaded primary content retrieved through a network connection (such as through the modem 112), in order to provide linked or associated user-customized auxiliary content. For this alternative embodiment, the distribution of the software product is referred to as an "on-line" distribution embodiment. Such auxiliary content could be provided by the primary content provider server system 110, or by a separate server maintained by an auxiliary content provider or other primary content provider (not shown).

The server may implement various different methods of distributing the software product content to the user operating the network game console 114. As stated above, the product content generally comprises limited use digital content such as computer games, music clips, full-length audio and video programs, movies, still picture data, and other similar types of content that are intended for restricted use by the customer. For example, the content data may comprise a game or movie video that has been rented for a certain period of time. After the rental period has expired, the content data is no longer available to the user. The content might further comprise promotional or advertising data associated with the primary content, such as movie previews, demo games, sample data, and other similar types of content that facilitate the user's selection of the distributed product. The ID of the network game console 114 as encoded on the memory card 124 or other similar memory means is used to facilitate the downloading and execution of the software products distributed from the server over the network 108 or through packaged storage media 122. In one embodiment, the network game console user establishes a user account managed by the server 102. Data related to the user account is stored in customer database 104. The user is issued an ID number that is used to facilitate the purchase and distribution of software products requested by the user.

In one embodiment of the present invention, the network game console 114 is used by a customer to playback the purchased or rented software title. At least one encoded software product (also referred to as a "software title") to be used by the customer is stored on a high capacity RAM medium, such as the unused high capacity memory medium on the CD-ROM/DVD-ROM housed in the network game console 114 or on a hard disk or the like. For example, in the embodiment illustrated in FIG. 1, the encoded software title can be provided on packaged storage media 122 or downloaded onto a local memory device, such as re-writeable storage media 116. In a typical off-line embodiment, in which the software product is played back on a playback system 114 that is not connected to a network, the product is either obtained by the user from a retail or distribution location, or sent to the user in response to a user request or as part of a subscription process. Furthermore, the communication used to decode the encoded software product is accomplished between the user and server using off-line means, such as telephone 132.

Figure 2A:
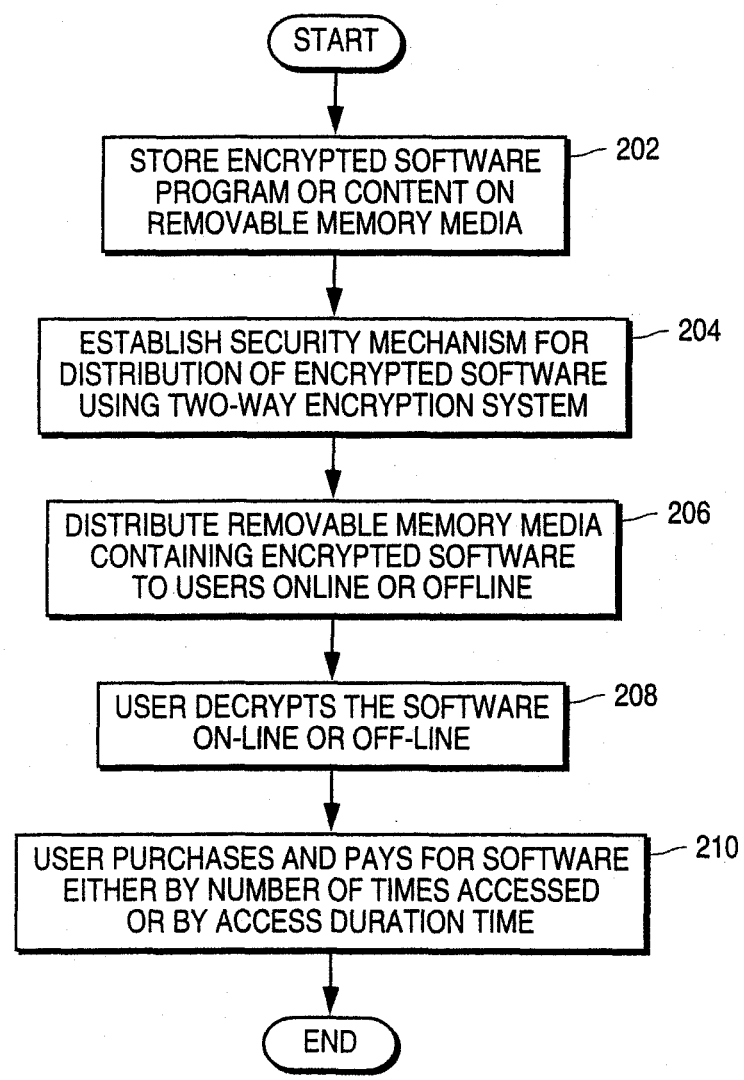
FIG. 2A is a flowchart that illustrates the steps of distributing and charging for downloaded restricted use software products, according to one embodiment of the present invention.

FIG. 2A illustrates the steps of encoding and distributing a limited use software product, according to one embodiment of the present invention. In step 202, the program code comprising the software title to be distributed is encrypted, or otherwise securely stored on a high capacity memory medium, such as a CD-ROM or DVD disk that comprises the packaged storage media 122. In step 204, an appropriate security mechanism is established for the distribution of the encrypted software title. In one embodiment, a two-way public key/private key encryption system is utilized. In this case, each software title to be distributed is first encrypted with the public key for that title. The server must have access to the secret key for each software title that is to be distributed or rented. In step 206, the removable memory media containing the encrypted software title is distributed to the users. In one embodiment, the users are sent, or otherwise obtain a copy of the packaged media 122, e.g. disk or other memory media, containing the title. This constitutes an off-line distribution of the software product. In an alternative embodiment, the network game console 114 may be coupled to the server over a computer network 108. For this embodiment, the users may be able to download the software title over the network for storage on a local hard drive or memory within their network game console. This constitutes an on-line distribution of the software product.

In step 208, the customer decrypts the encrypted software product to gain access rights to the product. The decryption step can be accomplished through either off-line means or on-line means. For the off-line decryption embodiment, the user uses the telephone 132, or similar device, to communicate the appropriate decryption information, e.g., private key or private password information, to the server. The server may then return a code that allows access to the software product. The user may provide the decryption information to the server using alphanumeric entry through a touch-tone phone or vocal commands to the system directly or an operator. For the on-line embodiment in which the client system 120 is coupled to the server system 110 through a network 108, the customer transmits the decryption information to the server through the game console 114.

In step 210, the users are given a choice with regard to purchase options for the distributed software title. In general, there are two purchase options available, the user may pay for use based on the number of times the program is accessed (e.g., the number of times a game is played), or by the amount of time spent accessing the program (e.g., total playing time of the game). Alternatively, a combination of these two purchase options may also be possible. For example, the use of a program or game may be limited based on a set number of accesses, each a certain time period long.

Figure 2B:
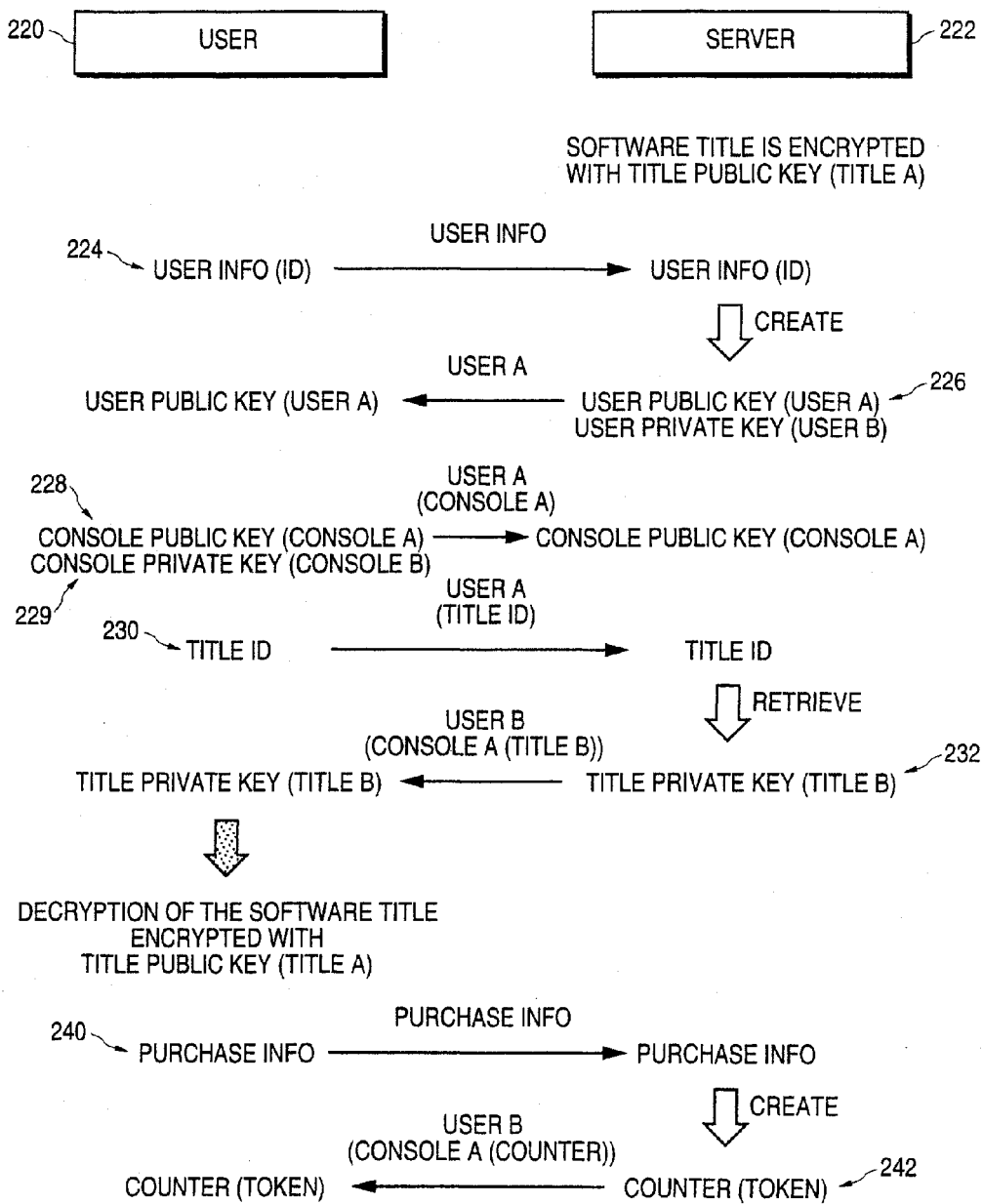
FIG. 2B illustrates an encryption/decryption process for distributing software products in a client/server computer network, according to one embodiment of the present invention.

FIG. 2B illustrates an encryption/decryption process for distributing software products in a client/server computer network, according to one embodiment of the present invention. FIG. 2B provides a more detailed illustration of the encryption process illustrated in FIG. 2A. FIG. 2B illustrates the encryption/decryption processes performed by a user 220 on a client computer (or "console") and a server computer 222 over a network. The server computer 222 provides a software product (also referred to as a software title) requested by the user 220. To ensure secure distribution of the software product over the network, the exchange between the user and server incorporates a multi-layered public key encryption (PKCS) to enable decryption of the software product content stored on storage media (e.g., magnetic or optical disk) by a user from a server. In general, for the process illustrated in FIG. 2B, the server 222 encrypts a key that can be decrypted using a matching private key created at the client computer (console). The server 222 creates a pair of keys (User A and User B) and transmits one of the keys (User A) to the user. This key allows the user to decrypt the contents of the software product. The server encrypts this key using the key sent from the user, then re-encrypts the encrypted key with its corresponding key (User B) of the key pair. And transmits to the user the double encrypted key.

Figure 5:
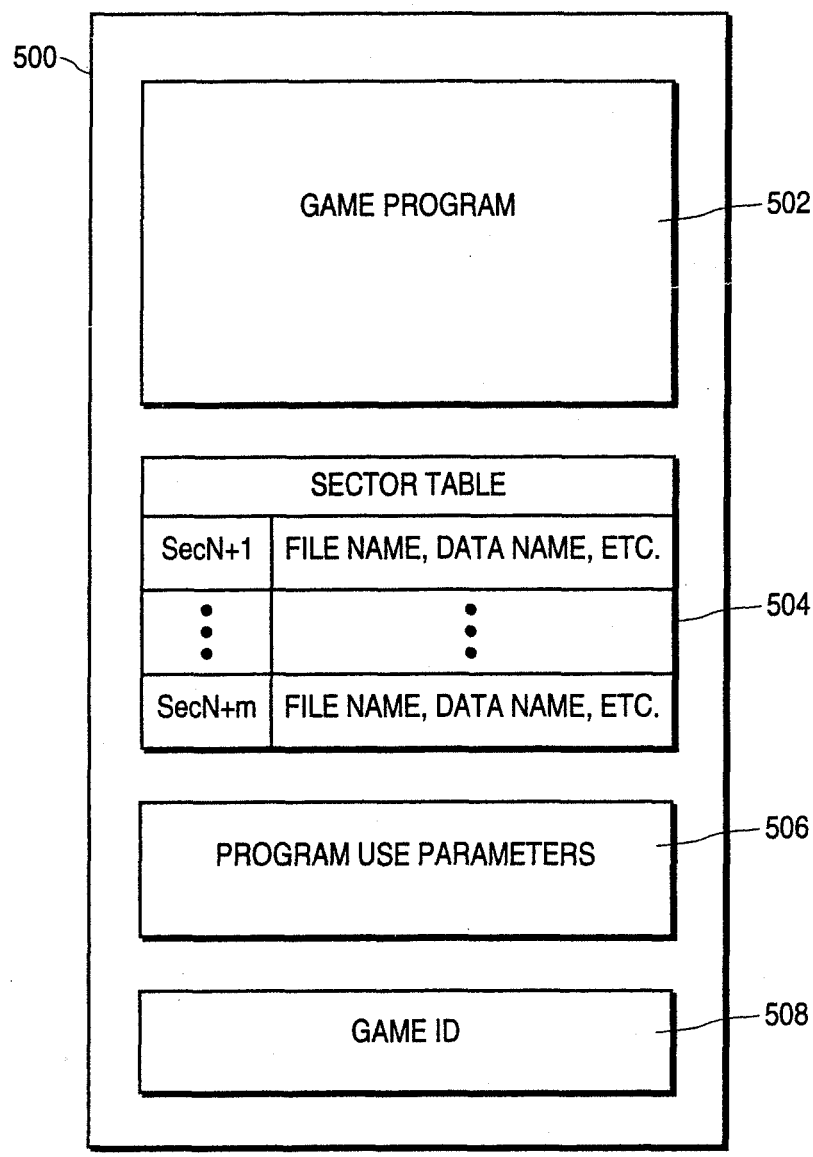
FIG. 5 illustrates the composition of an interactive game software product that includes encryption identification information and use parameters, according to one embodiment of the present invention.

For the embodiment illustrated in FIG. 5, the software title is encrypted with the title public key (Title A). To start the process, the user 220 provides user information to the server 222. The server 222 uses the user information to create a user public key (User A) and user private key (User B) pair 226. The server 222 then transmits the User A key back to the user 220. A console public key/private key pair comprising a Console A key 228 and a Console B key 229 is then created for the user 220. The user encrypts and transmits the console public key (Console A) 228 to the server 222 using the user public key (User A). The user 220 next transmits the title ID to the server 222 for the software product to be purchased. The server 222 retrieves title private key (Title B) 232 for the specified software product. The Title B key is the private key corresponding to the title public key (Title A) used to encrypt the specified software product. The server 222 then transmits the Title B key to the user 220 using encryption provided by the user private key (User B) and the console public key (Console A). At the user side, the user will use the user public key (User A) to decrypt the user private key (User B), and the console private key (Console B) to decrypt the console public key (Console A) The user can the freely access the software title after finally decrypting it using the title private key (Title A) obtained from the server 222.

After the decryption of the software title that was encrypted with the title public key (Title A) by the server 222, the user transmits purchase information 240 to the server 222. Using the purchase information, the server 222 creates a usage counter 242. The usage counter can be embodied in an electronic token that is debited with each use, time period, or some other unit of measure. The counter is encrypted and transmitted to the user 220 using the Console A and User B keys.

As illustrated in FIG. 2A, the user public key/private key (User A/User B) pair 226 is created by the server 222. Using the user information provided by the user 220. In one embodiment, one user key pair 226 is created for the user 222 for use in all subsequent transactions with server 222 in which the user information used to create the key pair is relevant. Alternatively, a new key pair 226 is created for each different transaction between user 220 and server 222.

The console public key/private key pair 228, 229 is created by the user 220. This key pair can be created on the client computer by using hardware identification means, such as the unique serial number associated with the client computer, or an ID pattern associated with the hard disk drive within the client computer. For this embodiment, the key pair can be created using authorization software that is stored and executed in the hard disk drive of the client computer. Alternatively, the key pair 228, 229 can be created using a hardware authorization device, such as a dongle. In general, a dongle is a hardware-based security device that attaches to the serial or parallel printer port of the client computer and uses codes and passwords embedded inside the key to control access to software applications. For this embodiment, the software product requested by the user 220 will only run when that dongle is attached to the client computer.

As illustrated in FIG. 2A, there are four possible distribution and customer access embodiments available using the system of FIG. 1. The first embodiment is one in which the software product is distributed to the customer off-line using packaged storage media 122, and the customer provides decryption information to the server off-line using telephone 132. For this embodiment, the game console is used as a stand-alone device and is not coupled to the server system 110.

For the remaining embodiments, the game console 114 is coupled to the server system 110 over a direct communications or computer network, and some aspect of this network is utilized in the distribution and/or decryption aspect of the customer transaction. The second embodiment is one in which the software product is distributed to the customer on-line through transmission of the product over network 108, and the customer provides decryption information to the server system 110 through the network 108 and game console 114. The third embodiment is one in which the software product is distributed to the customer off-line through the use of packaged storage media 122, and the customer provides decryption information to the server system 110 through the network 108 and game console 114. The fourth embodiment is one in which the software product is distributed to the customer on-line through transmission of the product over network 108, and the customer provides decryption information to the server system 110 off-line using telephone 132.

Figure 3B:
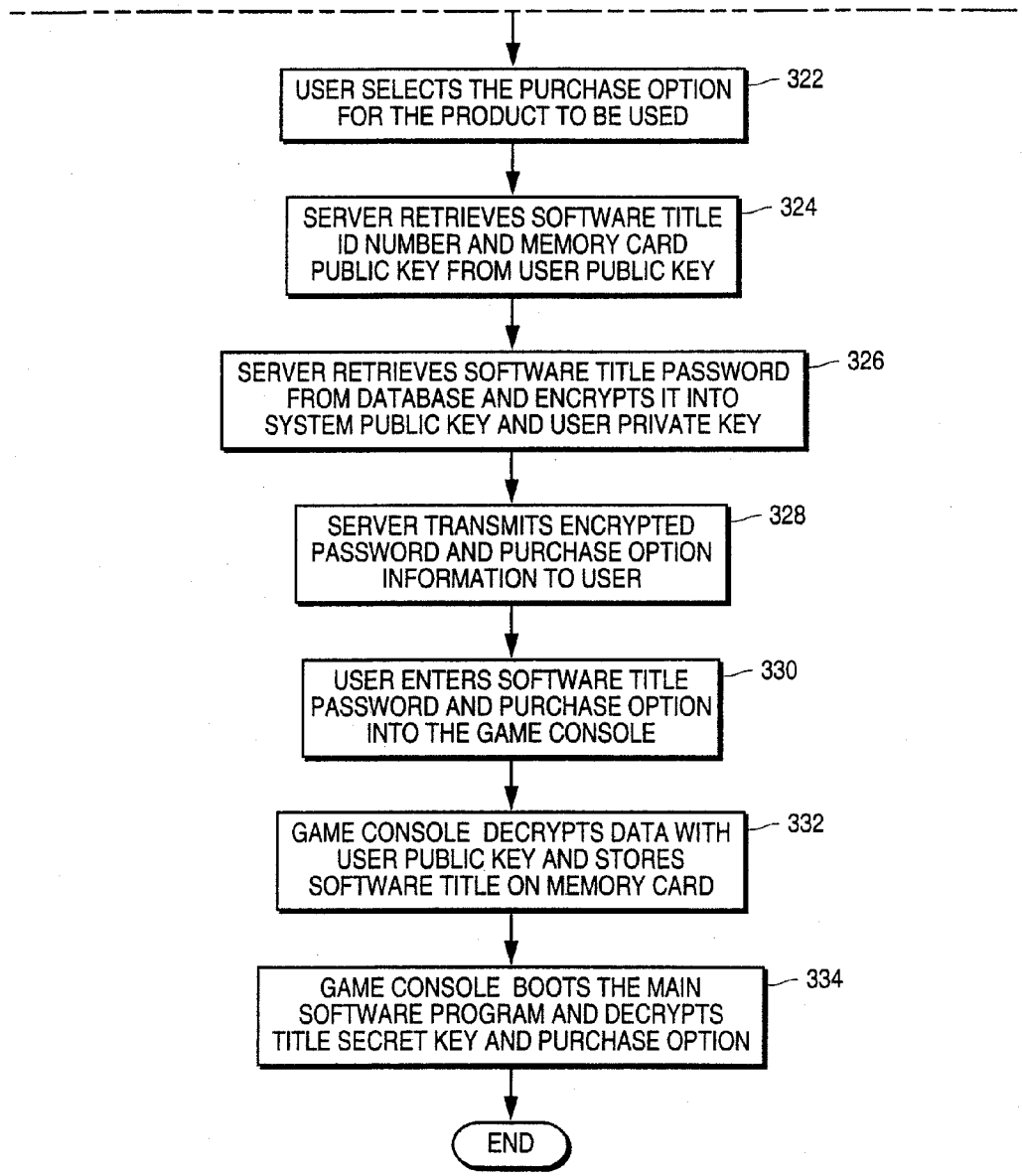
FIG. 3 is a flowchart that illustrates the steps of distributing a limited use software product for an off-line distribution embodiment of the present invention.

FIG. 3 is a flowchart that illustrates the steps of distributing a limited use software product for an off-line distribution embodiment of the present invention. FIG. 3 generally illustrates the steps executed on both the user side and server side of the distribution system illustrated in FIG. 1. For this embodiment, it is assumed that the user operates a network game console 114 upon which the leased software product is to be executed or played back. The network game console 114 can be implemented as a hardware system that provides digital playback of content provided on the media stored on re-writeable storage media 116 or packaged storage media 122; and can be embodied within a personal computer, dedicated game system (such as the Sony® Playstation®), wireless handheld device (such as a personal digital assistant, PDA), or other interactive computer entertainment system. For purposes of description, the network game console 114 is more generally referred to as an "Interactive Computer Entertainment System."

For the off-line embodiment illustrated in the flowchart of FIG. 3, the Interactive Computer Entertainment System is operated as a stand-alone game playing or content playback system and is not connected to network 108 for purposes of product distribution. In general, the user interacts with the server 102 over a phone line 130 and converses with customer service personnel or communicates through alphanumeric codes entered through the telephone 132 keypad.

In one embodiment, aspects of the present invention are used in a product distribution system in which the user has set up an account with the server 102 in order to receive software products. Thus, in step 302 of FIG. 3, the user establishes an account with the server to purchase and receive software products. In order to access his or her account, the user calls into the server using a touch-tone phone and enters account and purchasing information using the numeric keypad on the telephone. The server system is set up with a pre-set menu to instruct the user to enter the required information to complete the purchase transaction. For example, once the user has established an account, the user is issued an ID number. In step 302, the user enters his or her user ID number using the touch-tone telephone 132.

To establish a secure connection between the client user and server, the server implements a data encryption/decryption system. Thus, in step 304, the server creates a user public key and a user secret key for the user. In step 306, the server provides the user with the user public key. For the embodiment in which the user is communicating with the server over a telephone line, this information could be transmitted by a voice synthesizer which reads the user public key to the user over the phone, or by a similar arrangement. Alternatively, customer service personnel or operator could read the public key information to the user.

The packaged media containing a selection of software products is distributed to the user. This can occur generally at any time prior to the authorization process, and can be accomplished by several means, such as sending the packaged media to the customer or providing access to the media through a retailer. Using the Interactive Computer Entertainment System, the user then indicates which software title he or she would like to rent or otherwise purchase subject to limited use restrictions. The user may be presented with a menu of choices displaying the titles of programs or content available to be rented. The user enters his or her user public key into the Interactive Computer Entertainment System, step 308. In step 310, the Interactive Computer Entertainment System encrypts the ID number of the software title to be rented into the user public key. The Interactive Computer Entertainment System also encrypts the memory card public key into the user public key. In one embodiment, the memory card public key is created based on the information stored in the memory card and is programmed into the memory card that is inserted into the Interactive Computer Entertainment System upon use. The Interactive Computer Entertainment System then displays this encrypted information on the screen of a display device coupled to the system, step 312.

The encrypted information provided to the user comprises the decryption information that the user provides to the server to verify that the user is authorized to receive and use the product. As illustrated in FIG. 2A, the user can transmit the decryption information to the user either off-line or on-line depending upon whether or not the game console is coupled to the server system over a computer network or not. Thus, in step 316, it is determined whether the user is connected to the server through either on-line means or off-line means. If the user is not directly connected to the server (off-line), the user transmits the decryption information displayed on the screen by telephone to the server, step 318. If the game console is connected to the server through a direct communications network, the user transmits the decryption information to the server over the network line, step 320.

After the user transmits the decryption information to the server, the server verifies that the user is authorized to receive the product. In one embodiment, the server may be programmed to provide the user with a menu of choices regarding product purchase or rental options. The user is guided through a pre-determined set of menus that accept alphanumeric user input. Alternatively, voice recognition systems could be implemented so that the user enters commands using natural language input. In step 322, the user follows the instructions of the server to select the purchase option he or she prefers. For a limited use product, the user may be prompted to select between renting the product for a certain period of time or for a certain number of accesses (game plays), or combinations thereof. For embodiments in which the user has set up an account that includes a fund of money to be drawn upon, the appropriate purchase or rental fee is debited from the user's account. Alternatively, other payment methods could be established, such as payment over the phone by credit card or other electronic fund transfer methods.

The process continues from step 324, wherein the server retrieves the ID number for the software title and the public key for the memory card of the Interactive Computer Entertainment System from the decryption data (user public key data) received in step 318 or 320. The server then retrieves the corresponding private key for the software title from the database and encrypts it into both the memory card public key and the user private key, step 326. In one embodiment, the software programs for the software titles are stored in a contents database 106 tightly or loosely coupled to server 102. In this step, the server also encrypts the data for the purchase option that the user selected into both the memory card public key and the user private key.

In step 328, the server transmits the encrypted private key and purchase option information to the user. For the off-line distribution embodiment illustrated in FIG. 3, this information may be provided over the telephone 132 to the user. The user then enters this encrypted information into the Interactive Computer Entertainment System, step 330. In step 332, the Interactive Computer Entertainment System decrypts the data using the user private key and stores the decrypted data on the memory card.

For the off-line distribution embodiment of FIG. 3, the software product for the selected title is provided on a packaged storage media, such as disk 122. Upon selection by the user, this media is either obtained by the user prior to selection of the title to be accessed, or it can be sent or otherwise obtained by the user after selection of the title. After the user inserts the packaged storage media into the Interactive Computer Entertainment System, the system then boots up the software title, step 334. When booted, the software title decrypts the title's secret key and the purchase option information using the memory card secret key. The Interactive Computer Entertainment System uses the title secret key to decrypt the software title so that it is can be accessed or played on the system.

In one embodiment of the present invention, the purchase option information may be coded in the form of "tokens" that represent the units of time number of game plays. These tokens are updated by the appropriate number of units each time the title is restarted or at certain intervals of playing time. For example, for games the tokens would be updated at the end of each game. When the allotted time is up or the number of games remaining reaches zero, the title freezes and will not allow user access until the user renews his or her rental.

The process illustrated in FIG. 3 represents an embodiment in which the game console 114 is used in an off-line environment, and is not coupled to the server 102 through a network connection for distribution, and is used as a standalone playback or game console. For this off-line mode, the user obtains the packaged storage media containing the selected title, and communicates with the server 102 through a telephone, or some other method. In an alternative on-line distribution mode, the game console is coupled to the server system through a communications or computer network 108.

Figure 4B:
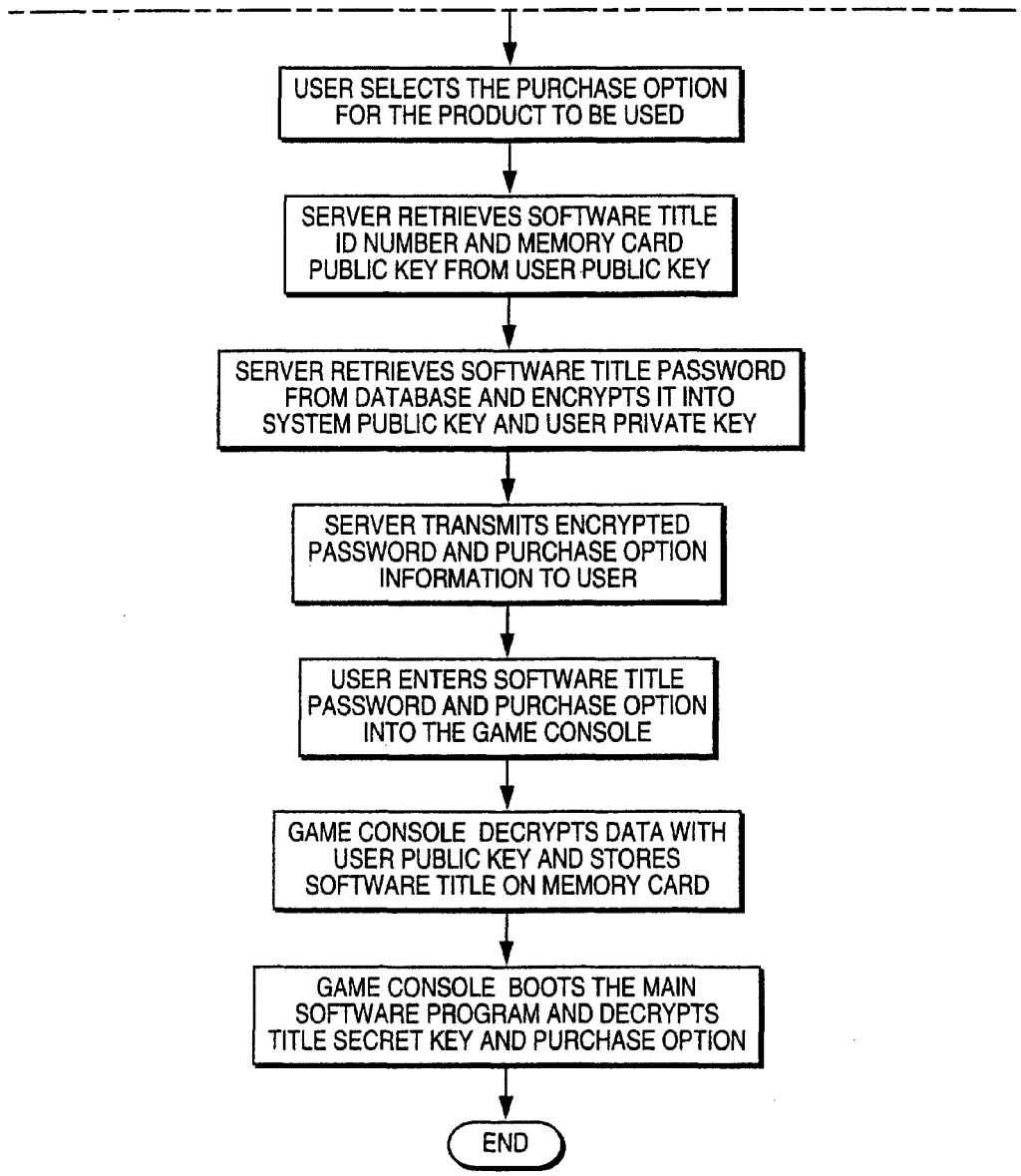
FIG. 4 is a flowchart that illustrates the steps of accessing limited use products for an on-line distribution embodiment of the present invention.

FIG. 4 is a flowchart that illustrates the steps of distributing a limited use software product for an on-line distribution embodiment of the present invention. For this embodiment, the network game console 114 is coupled to the server over network 108 and is used in an on-line mode. For the on-line embodiment, the Interactive Computer Entertainment System is operated as a networked game playing or content playback system. Thus, although it can be used as a standalone unit, the Interactive Computer Entertainment System is coupled to network 108 through a network interface. This allows the user to communicate with the server 102 through the Interactive Computer Entertainment System directly rather than through off-line means, such as the telephone or second networked computer. For this embodiment, certain steps in which the user interacts with the server, such as to receive the user public key and transmit game and purchase selection information to the server are performed using a network interface to communicate with the server directly over the network. A graphical user interface providing a menu of commands and selection options may be provided on the monitor 118 coupled to the network game console 114.

In one version of the on-line distribution embodiment of FIG. 4, the encoded title is still provided on a packaged storage media that is obtained by the user for insertion into the Interactive Computer Entertainment System. In an alternative version of the on-line distribution embodiment, the transmission of the selected software product is also accomplished using the network connection. For this embodiment, the server may retrieve the corresponding private key for the software title from the database and encrypts it into both the memory card public key and the user private key. The software programs for the software titles may be stored in a contents database 106 tightly or loosely coupled to server 102. In this step, the server also encrypts the data for the purchase option that the user selected into both the memory card public key and the user private key. Upon a request by the user, the server transmits the selected software product to the networked Interactive Computer Entertainment System, which then decrypts the appropriate encryption data and limited use information, and boots the software.

Many of the basic process steps illustrated in FIG. 4 are similar to those performed in the off-line distribution process illustrated in FIG. 3. The primary difference is that in step 406, the server provides the public key to the user on-line through the network connection. The server transmits or downloads the software product to the Interactive Computer Entertainment System through the network connection. In general, this can occur at any time during the process. For the on-line distribution process, the user can communicate the decryption information to the server computer either through on-line or off-line means. In step 416, it is determined whether the user transmits the decryption information on-line or offline. If off-line, the user transmits the decryption information to the server over telephone 132, step 418. If on-line, the user transmits the decryption information to the server over network 108. The remaining steps of the on-line distribution process are substantially similar to the off-line embodiment discussed with reference to FIG. 3.

For the processes illustrated in FIGS. 3 and 4, the parameters limiting the use of the rented software product are embodied within the purchase option information, and can be represented as tokens of time or number of accesses. In one embodiment of the present invention, the use parameters governing the limited access of the software product is programmed into the digital medium containing the product. FIG. 5 illustrates the composition of an exemplary software product that can be used in the system of FIG. 1.

FIG. 5 illustrates a software program that comprises a video game. The game program 500 may programmed onto a digital medium, such as a CD-ROM or DVD disk by procedures known to those in the art. As illustrated in FIG. 5, the software program or title 500 containing the game program 502 has certain different types of code sections associated with it. Game program 502 comprises the executable code the makes up the game itself. Associated with the game data is a sector table 504 that maps the various section of game code on the physical disk that the title 500 is stored on. The sector table includes the file names, revision dates, checksums, and other data associated with the modules comprising the game program 502.

In one embodiment, a set of program use parameters 506 are associated with the game program 502. The program use parameters include variables that encode the limited use constraints of the game program 502. For example, the program use parameter could be a counter value that serves to count the elapsed time of use of the game program. In this case, the game program might be distributed on a time-based rental basis. When the counter reaches a certain value, access to the game program 502 is blocked. Alternatively, the program use parameter could be a count value that counts the number of accesses to the game program. Once the pre-set number of accesses is exceeded, further access to the game program is blocked. Thus, using the program use parameter, once the specified rental period has elapsed, the game program or content automatically expires. This eliminates the need for the user to return the media to the content provider, or otherwise prove to the content provider that the product has been discarded or rendered unusable.

In one embodiment, the software package 500 also includes a game ID section 508. This section serves to identify the game to the system. The game ID section 508 can also be used to encode certain encryption data, such as some of the public key/private key data used by the system 100 to distribute the game to the user.

For the embodiment illustrated in FIG. 1, the software product distribution scheme utilizes an aspect in which the good that is purchased by the user is not necessarily the product media itself, but rather a key that can be used to unlock the program stored on the media. Identification information transmitted by the user is used by the server to generate the unlock key used by the user. In an alternative embodiment, the server generates the unlock key using identification information associated with the media, e.g., a CD disk ID number. Such a disk ID can be provided directly on the media itself or on packaging, or in a similar manner so that it is visible to the user who is purchasing the software product. An example of the use of this embodiment is in the free distribution of a CD or DVD disk that contains a sample of a program (e.g., a computer game, music, movie, etc.). The disk runs a demonstration or sample of the program or software application, and the user is presented with the option to purchase the complete executable program by placing an order through the phone or website. When a purchase is made, the user is provided with a software key (usually an alphanumeric string) that will unlock the full version of the software program, which is stored encrypted on the free disk. A media identifier, such as the CD/DVD serial number is used to secure the transaction between the user and the server. The use of a key that is associated with a media identifier prevents the problems associated with providing a key based on the playback machine identifier and in which all of the distributed media are identical. When the key is associated with the media, the media can be played on any compatible machine, but that particular key cannot be used to access other locked copies of the disk.

In one alternative embodiment, the security mechanism used to allow the user to access the full program contained on the media is a combination key that includes both the media identifier (e.g., disk serial number), and the playback machine identifier (e.g., client computer serial number) to generate the unlock key. For this embodiment, the software would then be keyed to both the disk and a specific playback machine. Although this presents a situation in which the disk cannot be played on another playback machine because the key is also unique to the CD, there is provided a mechanism that allows this.

When the user makes a purchase, either through on-line or off-line means (e.g., telephone), a database record is maintained which records both the serial number of the playback machine and the serial number of the disk. If the user is ever forced to replace their playback machine, he or she could request a new unlock key by inserting the disk into the new playback machine. The database then confirms that the disk serial number shows a purchase against it and therefore allows a new unlock key to be generated for the user. In one embodiment, an access counter is implemented so that the database only allows this procedure to be accomplished a limited number of times. The same procedure could be used to allow the disc to be played on a different, rather than replacement, playback machine. By limiting the number of times a new key can be generated, it is possible to eliminate the piracy of mass producing a disk with a single serial number. Although it may still be possible for unauthorized users to create many different serial number disks, they would still need to purchase the software for each copy of the serial number. In general, this would not be cost effective as long as the limit on new keys is low (say only two replacement keys are allowed). Furthermore, additional security could be required for a replacement key. For example, if a replacement key is requested, it may be necessary for a security question to be answered or for the key to be posted to a specific physical address or e-mail or for the person to be called back, thus allowing some identification of the person requesting the replacement key.

For the above-described embodiment, the user first receives a freely distributed disk, or other program containing media that contains a sample or limited version of the software product. At the end of the free trial or demo, an instruction page is displayed which tells the user how to purchase the game instantly. Purchasing can be done on-line through the accessing a displayed URL to connect to an automated web-site, or off-line through calling a displayed telephone number or mailing to a displayed address or fax number. A software routine on the disk will then generate a secure key. As described above, this key can be generated from just the disk serial number or from both the disk serial number and the serial number serial number of the playback machine, both of which can be read by the application. In one embodiment, the key is an alphanumeric string consisting of a combination of letters and numbers. They key that is generated can be used by server computer to uniquely identify both the disk serial number and also the playback machine serial number.

When the user accesses the server computer, through either the on-line URL or off-line telephone number, he or she is asked to enter the key along with their credit card billing information. A secure database records this information and authorizes the credit card, and so on. After this step, the server generates the unlock key. The unlock key is generated as a combination of the key that user provides and a master key for that specific software application. The application is known to the server based on the disk serial number. The unlock key is stored securely in a central database, and is also an alphanumeric string of letters and numbers. Once the key is delivered to the user, and the user confirms receipt, the transaction is finished and the database records the transaction and the keys. If the user ever forgets or otherwise needs to re-access their key, they need only to call or go on-line again, enter the disk ID key which is always presented upon booting the disk and retrieve the unlock key since the database knows that this is a legitimately purchased key.

Once the user has received the unlock key, it can be entered into the playback machine through input means, such as a keyboard or some form of virtual keyboard. The playback machine stores the unlock key in a static memory area, such as a memory card or hard disk space. Upon execution, the main application program of the purchased software product verifies that the key is authentic and correct for that specific disk and playback machine. Assuming that the key is authentic, the main application is unlocked. For added security, the main executable file can be encrypted so that it cannot easily be hacked by an unauthorized user.

For this embodiment, transmission of the unlock key between the user and server computer can be accomplished using the encryption/decryption mechanism illustrated with reference to FIGS. 2A through 5. For example, with reference to the process illustrated FIG. 3A, the embodiment in which the media identifier is used to generate an unlock key results in step 310 including the addition of the disk or media serial number with the product ID and user memory card ID encrypted in the user public key. Similar additions can be incorporated into the flow chart illustrated in FIG. 4.

In the foregoing, a system has been described for distributing limited use software products over a computer network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A computer-implemented method for distributing a software module by a distribution server having access to a plurality of software modules, comprising:
encrypting said software module with an encryption key;
distributing said encrypted software module, over a network, from said distribution server to storage of a computing device of a user;
receiving information identifying the user;
creating, based on the information identifying the user, a user public key and a user private key;
sending the user public key to the computing device;
receiving a client public key from the computing device, wherein the computing devices creates the client public key and a client private key based on information identifying the computing device;
applying a first tier of encryption to a decryption key by encrypting the decryption key with the client public key, thereby creating an encrypted decryption key, and then applying a second tier of encryption to the decryption key by encrypting the encrypted decryption key with the user private key, thereby creating a two-tiered encrypted version of the decryption key; and
transmitting the two-tiered encrypted version of the decryption key to the computing device of the user, wherein the decryption key, once removed of the two-tiered encryption at the computing device is used to decrypt the encrypted software module present at the storage of the computing device.

2. The computer-implemented method as recited in claim 1, wherein the software module includes at least one feature, and wherein decrypting the software module unlocks one or more features.

3. The computer-implemented method as recited in claim 1, wherein the software module is one or more of a piece of code, digital software, a media file, a rented media file, music files, advertisements, image files, animation files, sounds, applets, interactive media programs, interactive video programs, games, or networked games.

4. The computer-implemented method as recited in claim 1, wherein the computing device of the user is one of a networked computer, a networked game console, a wireless handheld device, or an interactive computer entertainment system.

5. The computer-implemented method as recited in claim 1, wherein the encryption key and decryption key are created by an entity associated with the distribution server to encrypt a title for the software module.

6. The computer-implemented method as recited in claim 1, wherein the distributing is initiated upon request of the user over the internet or directly to the user by the distribution server.

7. The computer-implemented method as recited in claim 1, wherein the distributing of the encrypted software module to the storage of the computing device is in response to a download request from the computing device of the user.

8. A computer-implemented method for distributing a software module from a distribution server having access to a plurality of software products, the software module having one or more features, comprising:
encrypting said software module with an encryption key;
distributing said encrypted software module, over a network, from said distribution server to storage of a computing device of a user;
receiving information identifying the user;
creating, based on the information identifying the user, a user public key and a user private key;
sending the user public key to the computing device;
receiving a client public key from the computing device, wherein the computing devices creates the client public key and a client private key based on information identifying the computing device;
applying a first tier of encryption to a decryption key by encrypting the decryption key with the client public key, thereby creating an encrypted decryption key, and then applying a second tier of encryption to the decryption key by encrypting the encrypted decryption key with the user private key, thereby creating a two-tiered encrypted version of the decryption key; and
transmitting the two-tiered encrypted version of the decryption key to the computing device of the user, wherein the decryption key, once removed of the two-tiered encryption at the computing device is used to decrypt the encrypted software module present at the storage of the computing device.

9. The computer-implemented method as recited in claim 8, wherein decrypting at least one of the features unlocks one feature.

10. The computer-implemented method as recited in claim 9, wherein decrypting at least one of the features unlocks a full version of the software module.

11. The computer-implemented method as recited in claim 9, wherein the software module is one or more of a piece of code, digital software, a media file, a rented media file, music files, advertisements, image files, animation files, sounds, applets, interactive media programs, interactive video programs, games, or networked games.

12. The computer-implemented method as recited in claim 9, wherein the computing device of the user is one of a networked computer, a networked game console, a wireless handheld device, or an interactive computer entertainment system.

13. The computer-implemented method as recited in claim 9, wherein the encryption key and decryption key are created by an entity associated with the distribution server to encrypt a title for the software module.

14. A computer-implemented method for distributing a software product from a distribution server having access to a plurality of software products, the software product having one or more features, comprising:
   receiving information identifying a user;
   creating, based on the information identifying the user, a user public key and a user private key;
   sending the user public key to the computing device;
   receiving a client public key from the computing device, wherein the computing devices creates the client public key and a client private key based on information identifying the computing device;
   for a particular software product, applying a first tier of encryption to a decryption key for the particular software product by encrypting the decryption key with the client public key, thereby creating an encrypted decryption key, and then applying a second tier of encryption to the decryption key by encrypting the encrypted decryption key with the user private key, thereby creating a two-tiered encrypted version of the decryption; and
   transmitting the two-tiered encrypted version of the decryption key to the computing device of the user, wherein the decryption key, once removed of the two-tiered encryption at the computing device is used to decrypt at least one of the features of the software product present at a storage of the computing device.

15. The computer-implemented method as recited in claim 14, further comprising:
   at a time of distribution or before distribution of the software products, encrypting one or more of the a plurality of software products with an encryption key.

16. The computer-implemented method as recited in claim 1, wherein the information of the computing device includes a unique serial number associated with the computing device.

17. The computer-implemented method as recited in claim 1, wherein the information of the computing device includes an identifier associated with a hard disk drive within the computing device.

18. The computer-implemented method as recited in claim 1, wherein the information of the computing device is obtained from hardware authorization device coupled to the computing device.

* * * * *